(12) United States Patent
Fisch et al.

(10) Patent No.: US 11,977,211 B2
(45) Date of Patent: May 7, 2024

(54) MULTI-MODAL WIDE-ANGLE ILLUMINATION EMPLOYING A COMPOUND BEAM COMBINER

(71) Applicant: Orbotech Ltd., Yavne (IL)

(72) Inventors: David Fisch, D.N. Modi'im (IL); Avraham Adler, Nof Ayalon (IL); Ilia Lutsker, Kfar Saba (IL); Yigal Katzir, Rishon Lezion (IL); Avinoam Rosenberg, Talmon (IL)

(73) Assignee: Orbotech Ltd., Yavne (IL)

( * ) Notice: Subject to any disclaimer, the term of this patent is extended or adjusted under 35 U.S.C. 154(b) by 336 days.

(21) Appl. No.: 17/441,279

(22) PCT Filed: Jul. 9, 2020

(86) PCT No.: PCT/IL2020/050765
§ 371 (c)(1),
(2) Date: Sep. 20, 2021

(87) PCT Pub. No.: WO2021/005601
PCT Pub. Date: Jan. 14, 2021

(65) Prior Publication Data
US 2022/0155574 A1 May 19, 2022

Related U.S. Application Data

(60) Provisional application No. 62/872,731, filed on Jul. 11, 2019.

(51) Int. Cl.
*G02B 19/00* (2006.01)
*G02B 3/08* (2006.01)
(Continued)

(52) U.S. Cl.
CPC ........... *G02B 19/0066* (2013.01); *G02B 3/08* (2013.01); *G02B 21/361* (2013.01); *G02B 26/0833* (2013.01); *G02F 1/29* (2013.01)

(58) Field of Classification Search
CPC .... G02B 19/0066; G02B 3/08; G02B 21/361; G02B 26/0833; G02B 5/04; G02B 27/126; G02B 21/0016; G02B 21/125; G02F 1/29
See application file for complete search history.

(56) References Cited

U.S. PATENT DOCUMENTS 6,292,214 B1   9/2001   Sakano
6,318,863 B1   11/2001  Tiao et al.
(Continued)

FOREIGN PATENT DOCUMENTS

JP   2003029153 A   1/2003
JP   2004102132 A   4/2004
(Continued)

OTHER PUBLICATIONS

WIPO, International Search Report for PCT/IL2020/050765, dated Oct. 15, 2020.
(Continued)

*Primary Examiner* — Magda Cruz
(74) *Attorney, Agent, or Firm* — Hodgson Russ LLP

(57) ABSTRACT

Provided is an optical apparatus that includes an illumination assembly which include an extended radiation source emitting radiation with a controllable spatial distribution and telecentric condensing optics, configured to receive and project the emitted radiation with a numerical aperture exceeding 0.3 along a first optical axis onto a field and an imaging assembly that includes a sensor and objective optics configured to image the field along a second optical axis onto the sensor and also a prism combiner positioned between the field and the condensing and objective optics which is configured to combine the first and second optical axes, while reflecting at least one of the optical axes multiple times within the prism combiner.

24 Claims, 6 Drawing Sheets

(51) Int. Cl.
*G02B 21/36* (2006.01)
*G02B 26/08* (2006.01)
*G02F 1/29* (2006.01)

(56) References Cited

U.S. PATENT DOCUMENTS

| | | |
|---|---|---|
| 6,680,800 B1 | 1/2004 | Schreiber et al. |
| 8,514,385 B2 | 8/2013 | Ben-Levy et al. |
| 2004/0174591 A1 | 9/2004 | Sander |
| 2007/0263226 A1 | 11/2007 | Kurtz et al. |
| 2009/0190101 A1* | 7/2009 | Alasaarela ............ G03B 33/12 353/81 |
| 2012/0038819 A1 | 2/2012 | McMackin et al. |
| 2013/0279017 A1 | 10/2013 | Amitai |
| 2016/0306180 A1* | 10/2016 | Rosa ...................... G03B 33/04 |
| 2018/0329062 A1 | 11/2018 | Pacala et al. |
| 2018/0329065 A1* | 11/2018 | Pacala ............... H01L 31/02162 |
| 2019/0162945 A1 | 5/2019 | Hua et al. |

FOREIGN PATENT DOCUMENTS

| | | |
|---|---|---|
| JP | 2007537486 A | 12/2007 |
| JP | 2008170873 A | 7/2008 |
| JP | 2008533507 A | 8/2008 |
| JP | 2009075424 A | 4/2009 |
| JP | 2015088410 A | 5/2015 |
| JP | 2016024195 A | 2/2016 |
| WO | 2010010556 A1 | 1/2010 |

OTHER PUBLICATIONS

EPO, Extended European Search Report for EP Application No. 20837900.8, dated Jun. 26, 2023.

CNIPA, Office Action for CN Application No. 202080040640.9, dated May 27, 2023.

JPO, Office Action issued for JP Application No. 2022-500755, Feb. 22, 2024.

* cited by examiner

MULTI-MODAL WIDE-ANGLE ILLUMINATION EMPLOYING A COMPOUND BEAM COMBINER

FIELD OF THE INVENTION

The present invention relates generally to optical apparatus and methods, and particularly to illuminators.

BACKGROUND

Illuminators are used in optical devices to illuminate an object that is imaged by imaging optics.

U.S. Patent Application Publication 2013/0279017 describes an optical device, including a light waves-transmitting substrate having two major surfaces and edges, optical means for coupling light into the substrate by total internal reflection, and plurality of partially reflecting surfaces carried by the substrate wherein the partially reflecting surfaces are parallel to each other and are not parallel to any of the edges of the substrate, and wherein one or more of the partially reflecting surfaces is an anisotropic surface.

U.S. Pat. No. 6,292,214 describes a device wherein a light flux from the screen of the display unit is guided by an optical system to an observing optical system. The display screen, on which the image of the sample is displayed, can be observed through an eyepiece lens of the observing optical system.

U.S. Pat. No. 8,514,385 describes a method for inspecting an object and an inspection system, where the system includes: at least one primary light source followed by at least one illumination path imaging lens adapted to direct at least one primary light beam toward an area of an inspected object; at least one secondary light source followed by at least one collimating component and at least one concentrating component adapted to direct at least one secondary light beam toward the area; wherein the at least one primary light beam and the at least one secondary light beam illuminate the area such that substantially each point within an imaged portion of the area is illuminated over a large angular range characterized by substantially uniform intensity; a collection path that comprises an image sensor, a beam splitter path and a collection path imaging lens; wherein the beam splitter is positioned between the area and between the collection path imaging lens; and wherein the at least one collimating component defines a central aperture through which the at least one primary light beam propagates.

U.S. Patent Application Publication 2004/0174591 describes a lighting device for a microscope comprising at least one observation beam path, in particular a surgical microscope, with an illumination system and a deflection device for deflecting light emitted from the illumination system onto an object to be observed, in particular an eye to be operated on, the deflection device providing an illumination of the object under various illumination angles with regard to the at least one observation beam path, wherein the deflection device comprises two deflection elements at least partly provided as physical beam splitters.

SUMMARY

Embodiments of the present invention that are described hereinbelow provide improved apparatus and methods for illumination and imaging of a field.

The present invention will be more fully understood from the following detailed description of the embodiments thereof, taken together with the drawings in which:

DETAILED DESCRIPTION OF EMBODIMENTS

Overview

Figure 1:
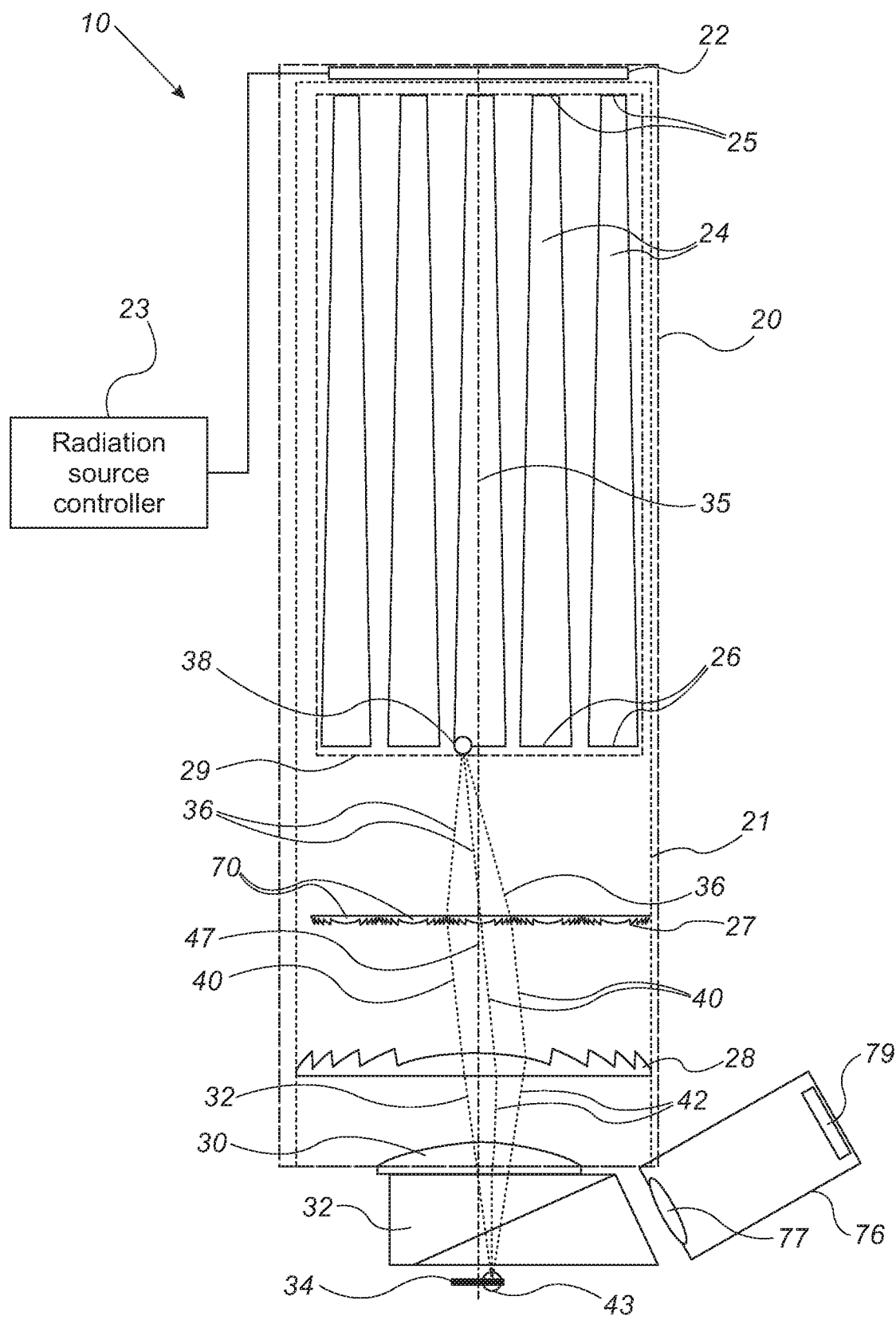
FIG. 1 is a schematic sectional illustration of an illumination and imaging apparatus, in accordance with an embodiment of the invention.

In applications of optical imaging systems, for example optical inspection of work pieces during a manufacturing process, an illuminator is used to illuminate a field on the workpiece with optical radiation. (The terms "optical radiation," "radiation," and "light" as used in the present description and in the claims refer generally to any and all of visible, infrared, and ultraviolet radiation.) The illuminated field of the workpiece is imaged by imaging optics and detected by a suitable sensor.

In some applications, accurate inspection requires that a field with a large diagonal dimension be illuminated over a wide extent of illumination angles, i.e., that the illumination has a high numerical aperture (NA). The inspection may further require that both the radiant flux per unit solid angle (radiant intensity) is uniform across the numerical aperture, and that the radiant flux per unit area (irradiance) is uniform across the field.

In optical radiometry, radiant intensity I and irradiance E are defined in terms of radiant flux, $\Phi$. The radiant flux $\Phi$ expresses the energy flowing in the radiation field, with a commonly used unit of watts (W). Radiant intensity I is defined in equation (1):

$$I = d\Phi/d\Omega \qquad (1)$$

wherein $\Omega$ is a solid angle. A common unit for radiant intensity I is W/sr, wherein sr denotes steradians as a unit for a solid angle. Radiant intensity may refer either to flux emitted into a solid angle or flux received into a solid angle.

Symbols $I_{EMIT}$ and $I_{RCV}$ are used in the description that follows to denote emitted radiant intensity and received radiant intensity, respectively.

Irradiance E for received flux $\Phi$ is defined in equation (2):

$$E = d\Phi/dA \quad (2)$$

wherein A is the area receiving the flux. A common unit for irradiance E is $W/cm^2$.

An additional radiometric term that is used in the present description, emittance M for emitted flux $\Phi$, is defined by equation (3):

$$M = d\Phi/dA \quad (3)$$

wherein A is the area emitting the flux.

Common illuminators are limited in terms of numerical aperture and angular extent of the optical field when a high degree of radiant intensity and irradiance is required over an illuminated field with a large diagonal dimension, especially when the diagonal dimension is much larger than the space between the field and the closest point of the illuminator (commonly termed "working distance" or "free working distance"). Conversely, for a high numerical aperture and large optical field, a high degree of radiant intensity and irradiance is difficult to achieve. When the illuminator is used as part of an imaging system, it is often necessary to insert a beamsplitter in the path of the illumination, so that an imaging assembly can capture images of the optical field. This constraint exacerbates the difficulties in meeting the design targets of the illuminator.

The embodiments of the present invention that are described herein address the problems described above by providing illuminators for use in conjunction with a beamsplitter and imaging assembly that achieve a high degree of both radiant intensity and irradiance over a large numerical aperture and a large optical field.

In the disclosed embodiments, an illumination assembly includes an extended radiation source, which emits radiation with a controllable spatial distribution. Condensing optics receive and focus the emitted radiation with a numerical aperture (NA) exceeding 0.3 along an optical axis onto a field of a diagonal dimension from 2 mm to 20 mm. The apparatus also includes an imaging assembly, comprising a sensor and objective optics, which image the field along a second optical axis onto the sensor. A prism combiner, positioned between the field and the condensing and objective optics, combines the optical axes, while reflecting at least one of the optical axes multiple times within the prism combiner.

Notwithstanding the large NA and wide field, the telecentric configuration of the disclosed illumination assembly, with its concomitant translation-invariance, ensures highly uniform illumination of the field. For example, the illumination assemblies described hereinbelow are capable of illuminating the field with irradiance that varies by no more than 10% across the field, and received radiant intensity that varies across the numerical aperture by no more than 20% at all points in the field. The multiple reflections within the beamsplitter are useful in enabling the large NA while meeting these objectives. Furthermore, the design of the condensing optics and the prism combiner enables the construction of illuminators with a combination of short working distance and wide illuminated field.

First Embodiment

FIG. 1 is a schematic sectional illustration of an optical apparatus 10, in accordance with an embodiment of the invention. Apparatus 10 comprises an illumination assembly 20 and an imaging assembly 76, together with a prism combiner 32, which combines the optical axes of the illumination and imaging assemblies, as described below.

Illumination assembly 20 comprises an extended radiation source 22, a radiation source controller 23, and condensing optics 21. Condensing optics 21 comprise a homogenizing rod array 29, a collimating lens array 27, a focusing lens 28, and a compensating lens 30. Collimating lens array 27 comprises individual collimating lenses 70, with further details shown in FIGS. 2-3 and 5. Illumination assembly 20, together with prism combiner 32, illuminates a field 34 along a first optical axis 35.

Imaging assembly 76 comprises objective optics 77 and a sensor 79, wherein the objective optics image field 34 onto the sensor.

Radiation source controller 23 typically comprises a programmable processor, which is programmed in software and/or firmware to carry out the functions that are described herein. Alternatively or additionally, radiation source controller 23 comprises hard-wired and/or programmable hardware logic circuits, which carry out at least some of the functions of the controller. Although radiation source controller 23 is shown in the figures, for the sake of simplicity, as a single, monolithic functional block, in practice the controller may comprise a single chip or a set of two or more chips, with suitable interfaces for outputting the signals that are illustrated in the figures and are described in the text. The controllers shown and described in the context of the embodiments that follow are of similar construction.

Figure 6:
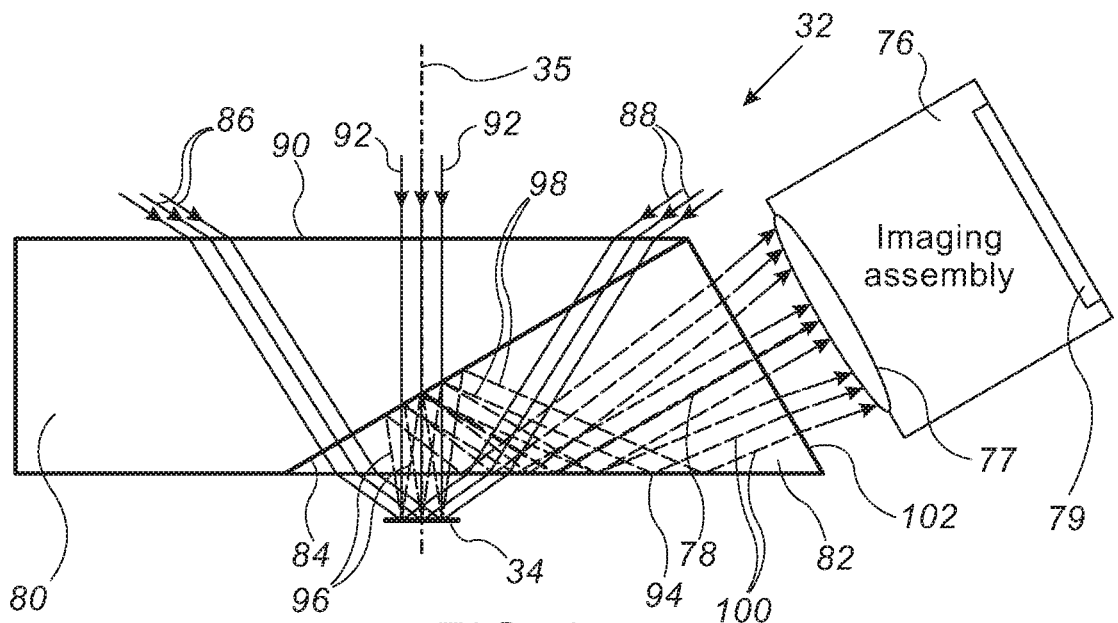
FIG. 6 is a schematic sectional illustration of a prism combiner used in the apparatus of FIG. 1, in accordance with an embodiment of the invention.

Prism combiner 32 is shown in FIG. 1 only schematically, with further details shown in FIG. 6. Prism combiner 32 comprises a polyhedron fabricated of a material that is transparent to radiation with an internal beamsplitter layer that is partially transmitting and partially reflecting so as to transmit a part of radiation entering the prism combiner and to reflect a part of it.

The illumination scheme of apparatus 10 may be divided into two independent parts: non-imaging optics, comprising extended radiation source 22 and homogenizing rod array 29, and imaging optics, comprising collimating lens array 27, focusing lens 28, compensating lens 30, and prism combiner 32. The function of the non-imaging optics is to mix the different wavelengths of light emitted by source 22 and to improve the light collection efficiency. An additional function of the non-imaging optics is to improve the angular uniformity of the illumination, thus converting low-frequency inhomogeneity to high-frequency inhomogeneity, which can then be easily smoothed out by the use of a fine diffuser. A part of the imaging optics is used to refocus the homogenized light emitted from the non-imaging optics part on field 34 with a good separation between the aperture segments, meaning that each homogenizing rod 29 sends rays only to a corresponding lens 70. The homogenizing rods and lenses are described in further detail below.

Homogenizing rod array 29 comprises homogenizing rods 24, which typically comprise solid rods fabricated of a material that is transparent to the radiation emitted by source 22 and/or hollow rods with reflective inner walls. Each rod comprises an entrance face 25 at one end and an exit face 26 at the other end. The cross section of homogenizing rods 24 is typically rectangular (for example, square) or circular, although other cross sections may alternatively be used. The cross section may in some cases vary along the axis of the rod. In the pictured embodiment, for example, the linear extent of exit face 26 of each homogenizing rod 24 is larger than its entrance face 25 by a factor of 2.5 or 3. As the étendue of the light propagating in each homogenizing rod 24 is conserved, the angle of emission of the light at exit face 26 is reduced by the same factor of 2.5 or 3. (The term "étendue" refers to the product of the cross-sectional area and the subtended solid angle of an optical beam.) Each homogenizing rod 24 increases the spatial uniformity of the radiation entering entrance face 25 and exiting exit face 26 by means of multiple reflections within the rod.

Extended radiation source 22 (further detailed in FIG. 4), is driven by signals from radiation source controller 23, and emits radiation into homogenizing rods 24 through their entrance faces 25. The radiation is transmitted through homogenizing rods 24 to their exit faces 26, from which it exits with uniform radiant emittance M (due to the homogenizing effect of the homogenizing rods) toward collimating lens array 27 (further detailed in FIG. 5).

Collimating lens array 27 receives the radiation and transmits and collimates the rays that have exited from each point on exit faces 26. For example, rays 36 exiting from a point 38 are collimated by one of lenses 70 of collimating lens array 27 into rays 40. The rays transmitted and collimated by collimating lens array 27 are received, transmitted and focused by focusing lens 28. All the rays focused by focusing lens 28 are received by compensating lens 30, and projected by the compensating lens further through prism combiner 32 to field 34. For example, collimated rays 40 are focused by focusing lens 28 to rays 42, which focus onto a point 43 on field 34.

Collimating lens array 27 forms a stop for illumination assembly 20, wherein each collimating lens 70 comprises a segment of the stop. As collimating lens array 27 is located in the focal plane of the combination of focusing lens 28 and compensating lens 30, its image as seen from field 34 is located at infinity (meaning that the exit pupil of condensing optics 21 is effectively at infinity). This configuration of having an exit pupil in infinity is termed "telecentric configuration." Thus condensing optics 21 provide a telecentric illumination to field 34, and the entire angular coverage observed from the field is translation-invariant across the field.

In terms of the irradiance E (spatial coverage) on field 34, exit face 26 of each homogenizing rod 24 is imaged by collimating lens array 27 and focusing lens 28 into the field, so that the images of all of exit faces 26 overlap in the field. The function of compensating lens 30 is to improve the quality of the imaging by reducing the optical aberrations of illumination assembly 20. For example, compensating lens 30 may have a meniscus shape, which is used to compensate for spherical aberration of the optics. Uniformity of radiant emittance M of each exit face 26 yields a uniform irradiance E on field 34.

Figure 2:
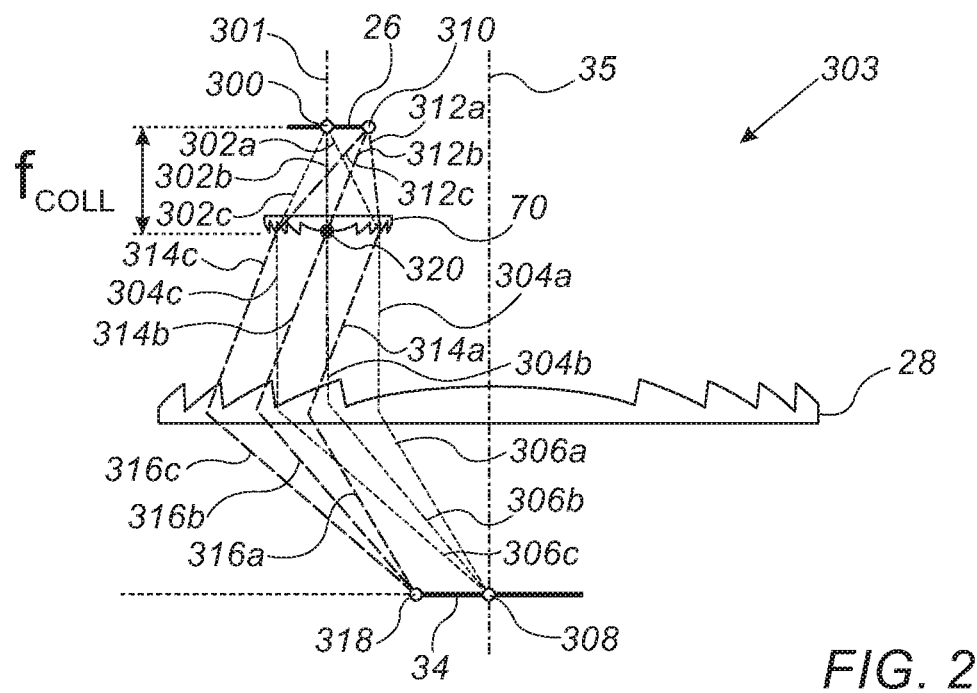
FIG. 2 is a schematic sectional illustration showing a detail of optical apparatus, in accordance with an alternative embodiment of the invention.

As will be detailed in FIG. 2, for the received radiant intensity $I_{RCV}$ (angular coverage) on field 34, the radiation from a given exit face 26 fills a part of the total numerical aperture of illumination assembly 20. Collimating lens array 27 (detailed in FIG. 5) fills the numerical aperture of the illumination assembly without gaps between the radiation from adjoining exit faces 26, thus yielding a substantially uniform received radiant intensity $I_{RCV}$ within the numerical aperture of the illumination. Furthermore, due to the telecentricity of the illumination as indicated above, the entire angular coverage of the illumination, as observed from field 34, is translation-invariant across the field. This property is particularly useful in implementing the multi-modal functionality of illumination assembly 20, providing both bright-field and dark-field illumination, for example, as explained more fully below.

Based on simulations by the inventors, the disclosed embodiment enables illumination of field 34 with a numerical aperture (NA) exceeding 0.3 over a field of a diagonal dimension from 2 mm to 20 mm with an irradiance that varies by no more than 10% across the field and with a radiant intensity that varies across the numerical aperture by no more than 20% at all points in the field. In some embodiments, these high levels of uniformity and wide field angle are achieved with NA in excess of 0.5, or even in excess of 0.75.

In an alternative embodiment (further detailed in FIG. 3), each exit face 26 comprises a field lens 406 and a diffuser 420, for further control of the uniformity of irradiance E and received radiant intensity $I_{RCV}$ on field 34.

FIG. 2 is a schematic sectional illustration showing a detail 303 of a partial optical path in optical apparatus 10, in accordance with an embodiment of the invention. The illustration demonstrates the effect of the telecentric design of condensing optics 21.

Detail 303 comprises the following parts from optical apparatus 10: exit face 26 of one of homogenizing rods 24, collimating lens 70 (from collimating lens array 27) that is positioned opposite exit face 26 along a third optical axis 301, focusing lens 28 along first optical axis 35, and field 34. The distance between collimating lens 70 and exit face 26 is $f_{COLL}$, wherein $f_{COLL}$ denotes the effective focal length of the collimating lens.

As shown in FIG. 1, the illumination is telecentric, as collimating lens 70 is located in the focal plane of the combination of focusing lens 28 and compensating lens 30. For the sake of clarity, compensating lens 30 and prism combiner 32 have been omitted from detail 303.

A point 300 at the center of exit face 26 emits rays 302a, 302b, and 302c, wherein central ray 302b coincides with third optical axis 301 and passes through a point 320 at the intersection between collimating lens 70 and the second optical axis. (Lenses 70 and 28 are treated as thin lenses.) Rays 302a and 302c are extreme rays of a cone of rays from point 300, located symmetrically around central ray 302b. (The term "cone of rays" is used to denote a group of rays either emitted from a point or incident on a point. The angular extent of a cone of rays is indicated by its numerical aperture.) Collimating lens 70 collimates rays 302a, 302b, and 302c to rays 304a, 304b, and 304c, respectively, which are then focused by focusing lens 28 to rays 306a, 306b, and 306c, focusing to a point 308 on field 34 at the intersection of the field with first optical axis 35.

A point 310 at the edge of exit face 26 emits rays 312a, 312b, and 312c, wherein central ray 312b passes through point 320 on collimating lens 70. Rays 312a and 312c are extreme rays of the cone of rays from point 310, located symmetrically around central ray 312b. Rays 312a, 312b, and 312c are collimated by collimating lens 70 to rays 314a, 314b, and 314c, respectively, which are then focused by focusing lens 28 to rays 316a, 316b, and 316c, focusing to a point 318 on field 34.

Both rays 304b and 314b pass through point 320 on collimating lens 70. Since collimating lens 70, including point 320, is located at a focal plane of focusing lens 28, the focusing lens refracts rays 304b and 314b from point 320 so that the resulting refracted rays 306b and 316b are parallel to each other. Due to the parallelism of central rays 306b and 316b of the two cones of rays (one comprising rays 306a-306c and the other comprising rays 316a-316c), and the fact that the extreme rays are symmetrical around their respective central rays over the entire optical path, the two cones extend over the same numerical aperture around first optical axis 35 at field 34 at two separate field points 308 and 318. Thus, the numerical aperture of the illumination is translation-invariant due to the telecentric design of condensing optics 21.

The angular uniformity of the received radiant intensity at point 308 within the cone comprising rays 306a-306c is determined by the angular uniformity of the emitted radiant intensity $I_{EMIT}$ at point 300 on exit face 26. Similarly, the angular uniformity of the received radiant intensity at point 318 within the cone comprising rays 316a-316c is determined by the angular uniformity of the emitted radiant intensity $I_{EMIT}$ at point 310.

Thus, the numerical apertures of the cones of radiation impinging on field 34 are determined by the extent and lateral positions of collimator lenses 70 in collimating lens array 27, and the numerical aperture is translation-invariant across field 34. Furthermore, the uniformity of the received radiant intensity on field 34 within the numerical aperture is determined by the uniformity of the emitted radiant intensity from exit face 26.

Each point in field 34 receives radiation from a corresponding point in exit face 26 of each homogenizing rod 24. Thus, for example, point 308 receives radiation from a center point of each exit face 26, and point 318 receives radiation from an edge point on each exit face. Thus, the irradiance E on field 34 is an averaged emittance M of all homogenizing rods 24, contributing to a high degree of uniformity of the irradiance.

Figure 3:
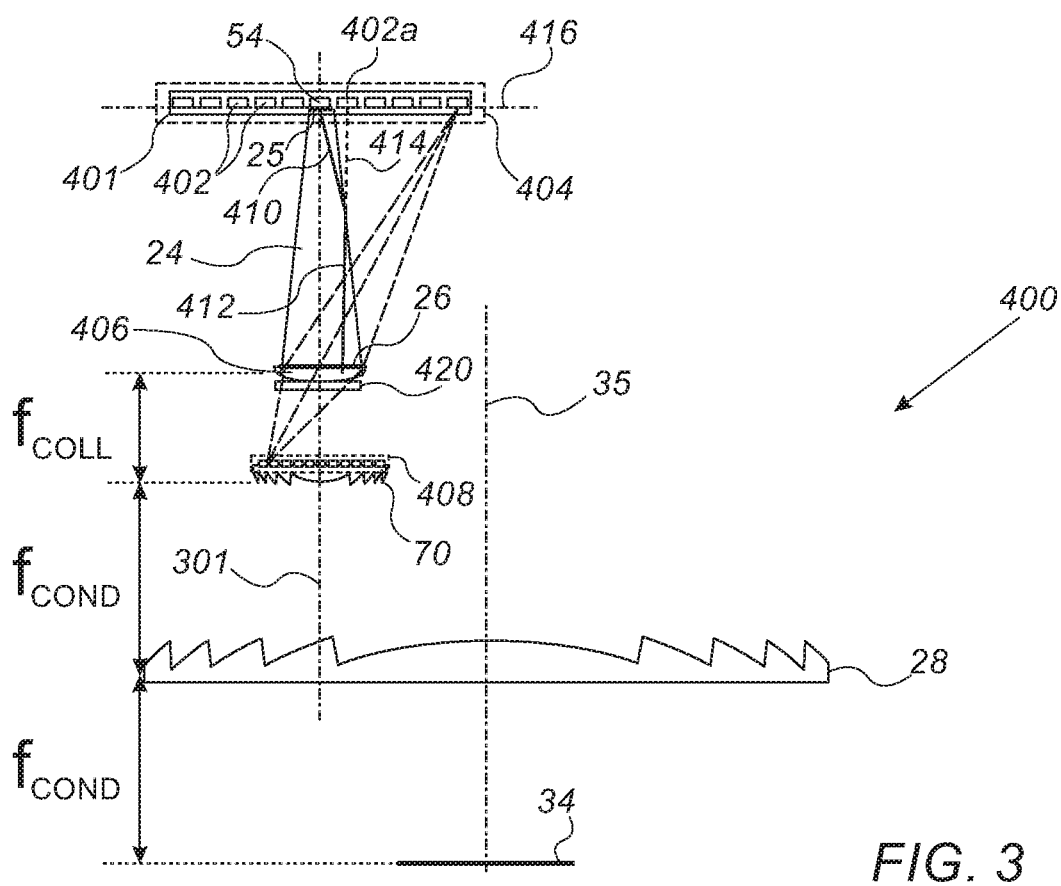
FIG. 3 is a schematic sectional illustration showing a detail of the optical apparatus of FIG. 1, in accordance with an embodiment of the invention.

FIG. 3 is a schematic sectional illustration showing a detail 400 of another partial optical path, illustrating the addition of plano-convex field lens 406, in accordance with an alternative embodiment of the invention. This detail can be used in apparatus 10 in place of detail 303 (FIG. 2).

Detail 400 comprises the following parts: an array 401 of emitters 54 within extended radiation source 22 (as will be detailed in FIG. 4), homogenizing rod 24 with entrance face 25 and exit face 26, collimating lens 70 opposite exit face 26 along third optical axis 301, focusing lens 28 along first optical axis 35, and field 34. Field lens 406 is located in contact with or in close proximity to exit face 26, wherein the flat face of the plano-convex shape is well suited for cementing the field lens to the exit face.

A ray 410 is emitted from group 54, and is reflected by a side wall of homogenizing rod 24 into a ray 412. Due to the reflection, a virtual source 402a is formed as an image of group 54. The location of virtual source 402a is found by extending ray 412, shown as a dotted line 414, to a surface 416, which in general is a curved surface due to the folding of the rays by the side walls of homogenizing rod 24. Multiple reflections of rays emitted from group 54 by homogenizing rod 24 generate additional virtual sources 402, forming together a virtual extended source 404. For a solid homogenizing rod 24, the maximal lateral extent W of source 404 is given by the length L of the rod, the ratio M between the linear dimensions of exit face 26 and entrance face 25, and the refractive index n of its material according to equation (4):

$$W \approx \tan\left[\arcsin\left(\frac{1}{M \times n}\right)\right] \times L \quad (4)$$

The gaps between adjacent virtual sources 402 decrease with an increasing number of reflections in homogenizing rod 24. However, due to the finite length L, these gaps do not completely disappear.

Field lens 406 images extended virtual source 404 onto collimating lens 70 as an image 408, thus filling the collimating lens with the image, and consequently filling the numerical aperture of the illumination incident on field 34 from the collimating lens. As the illumination is imaged into the aperture stop of the illuminator (collimating lens 70), the illumination is of the Köhler-type.

Diffuser 420 (typically a weak diffuser, with a diffusing angle of, for example, 5 degrees) may be placed against field lens 406 on the side closer to collimating lens 70 in order to improve the angular uniformity of the radiation exiting from the collimating lens, and consequently to improve the uniformity of irradiance E in field 34.

Typical materials and dimensions of the optical components of the embodiment disclosed in FIGS. 1-3 are given in Table 1, below.

TABLE 1

Typical materials and dimensions

| Component | Material | Dimensions (in mm) |
|---|---|---|
| Homogenizing rod 24 | PMMA or BK7 | entrance face 25: 3 × 4.5<br>exit face 26: 7.5 × 11.25<br>length: 100 |
| Field lens 406 | PMMA or BK7 | diameter: 14<br>central thickness: 4<br>focal length: 35 |
| Collimating lens 70 | molded PMMA | focal length: 60 |
| Focusing lens 28 | molded PMMA | focal length: 80<br>diameter: 150 |
| Compensating lens 30 | BK7 | convex radius: 39.8<br>concave radius: 104<br>central thickness: 7<br>diameter: 50 |
| Prism combiner 32 | BK7 | thickness: 17.5<br>external angles: 60°, 30°, 90° |

Figure 4:
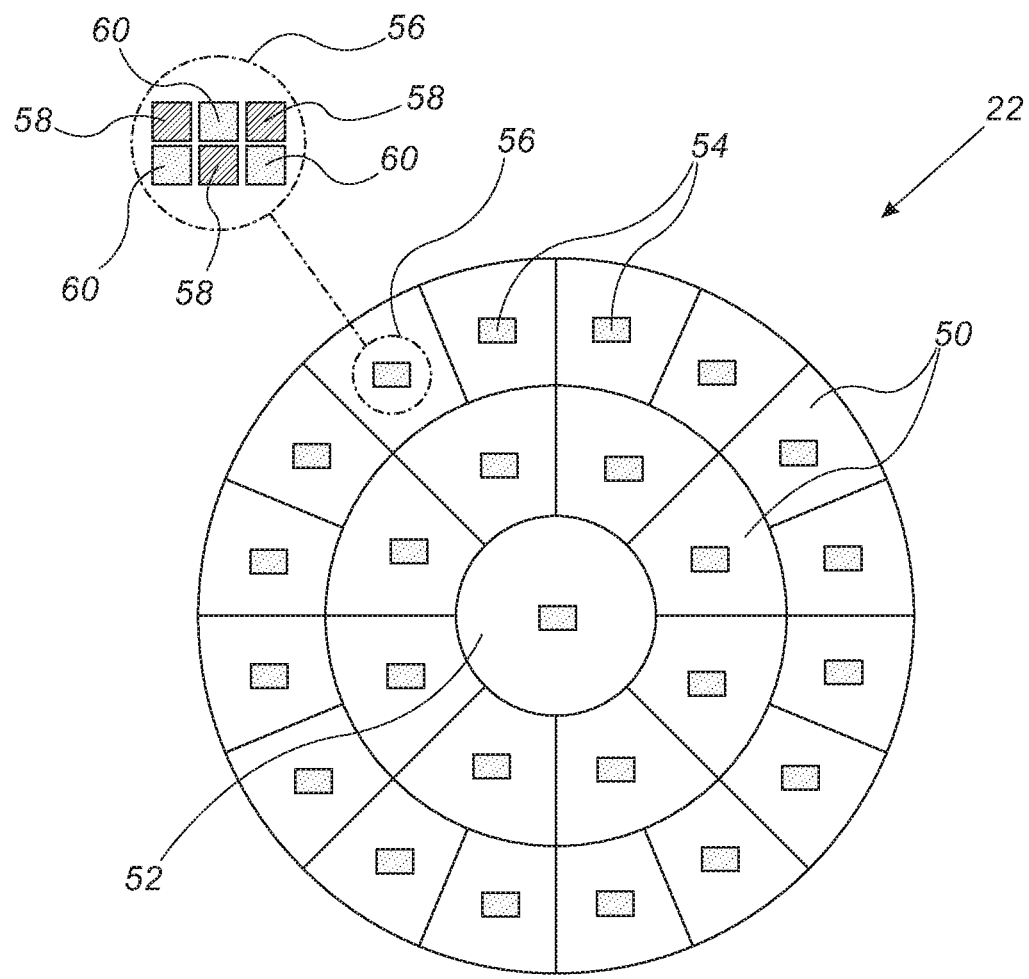
FIG. 4 is a schematic frontal illustration of a radiation source used in the apparatus of FIG. 1, in accordance with an embodiment of the invention.

FIG. 4 is a schematic frontal illustration of extended radiation source 22 used in illumination assembly 20, in accordance with an embodiment of the invention. Extended radiation source 22 comprises cells 50 of the shape of a truncated sector, with the exception of a center cell 52, which is circular. Homogenizing rods 24 are arranged so that there is exactly one homogenizing rod with its entrance face 25 facing each cell of extended radiation source 22.

Each cell of extended radiation source 22 comprises a group of emitters 54, emitting radiation toward the one homogenizing rod 24 facing that cell. An enlarged inset view 56 of one of groups of emitters 54 details how each group of emitters 54 comprises three emitters 58 emitting radiation at a wavelength $\lambda_1$ and three emitters 60 emitting radiation at a different wavelength $\lambda_2$. Emitters 58 and 60 comprise solid-state emitters, for example light-emitting diodes (LEDs) such as a red LED c41-A60 from OSRAM GmbH (Marcel-Breuer-Straße 6, 80807 München, GERMANY) and a blue LED EZ 1350 from CREE Inc., (4600 Silicon Drive, Durham, North Carolina 27703, USA). Alternatively, emitters 58 and 60 may emit radiation over spectral ranges that overlap. Further alternatively, emitters 58 and 60 may comprise so-called white-light LEDs, emitting broad-band radiation extending across the visible spectrum, such as available from CREE Inc. Alternatively, emitters 58 and 60 may emit radiation in the infra-red (IR) or ultraviolet (UV) parts of the electromagnetic spectrum. Emitters 58 and 60 preferably comprise LED dies placed in close proximity to one another. The objective of placing emitters 58 and 60 in close proximity is to achieve both high optical power injected into rods 24 and improved uniformity of the illumination. Each one of emitters 58 and 60 within each group 54 can be independently energized by radiation source controller 23. Illumination assembly 20 can thus illuminate only parts of the numerical aperture, such as for example dark field illumination or right or left side only, as well as controlling the spectral content of the illumination by enabling separate or simultaneous illumination at different wavelengths $\lambda_1$ and $\lambda_2$.

In an alternative embodiment, each group 54 of emitters may comprise, for example, three, four, five, or six emitters emitting at different wavelengths. By energizing these emitters independently, the spectral content of the illumination may be controlled to comprise any combination of the available wavelengths.

Figure 5:
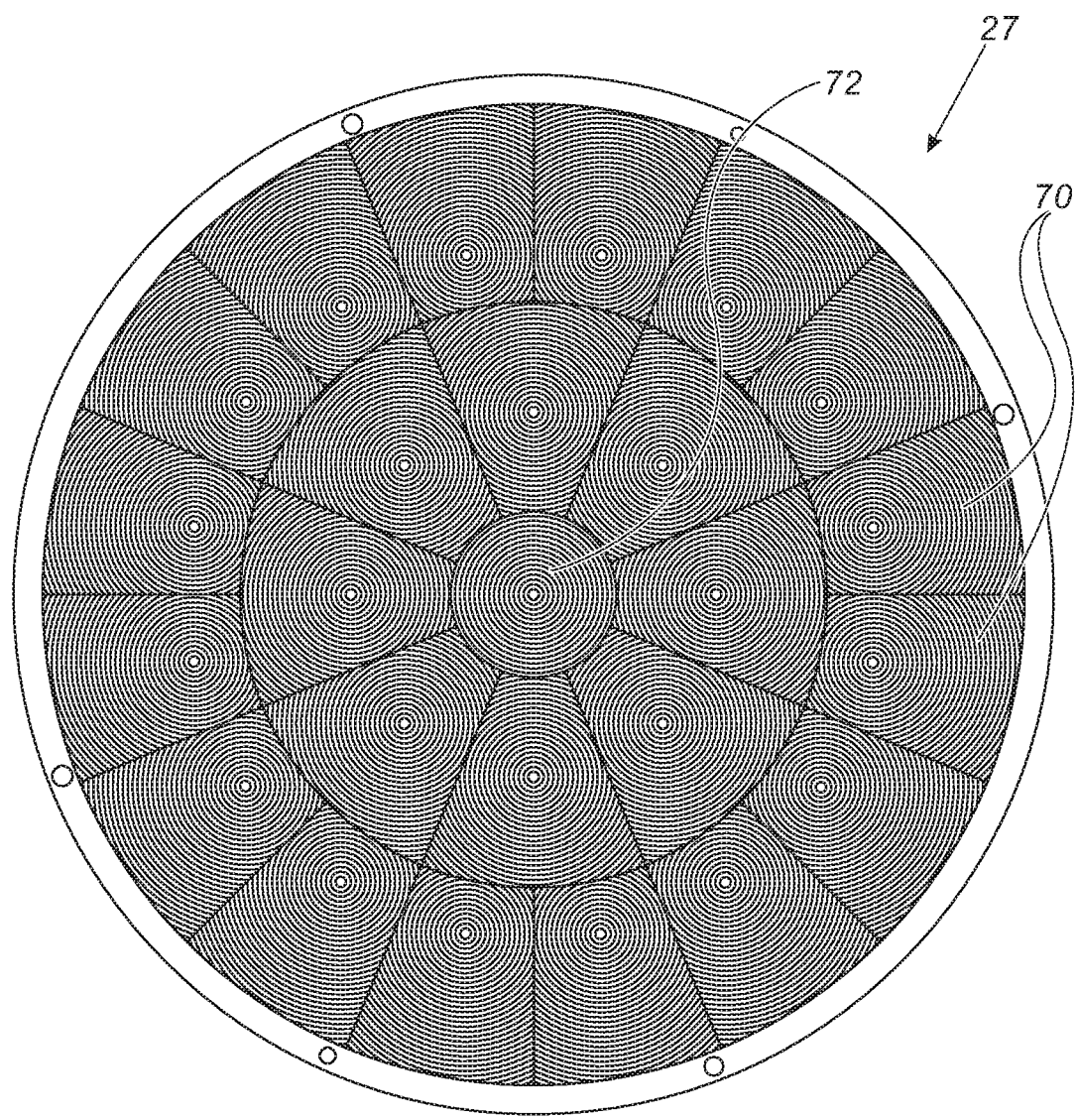
FIG. 5 is a schematic frontal illustration of a collimator lens array used in the apparatus of FIG. 1, in accordance with an embodiment of the invention.

FIG. 5 is a schematic frontal illustration of collimator lens array 27 in illumination assembly 20, in accordance with an embodiment of the invention. Collimator lens array 27 comprises—similarly to extended radiation source 22—lenses 70 in the shapes of truncated sectors, with the exception of a center lens 72, which is circular. Alternatively, other shapes of lenses 70 and 72 may be used. Collimator lens array 27 is designed so that each lens of the array receives radiation emitted from exit face 26 of exactly one of homogenizing rods 24. Each lens of collimator lens array 27 comprises a Fresnel lens, with the lenses butted together, thus facilitating a uniform received radiant intensity $I_{RCV}$ of the illumination on field 34, i.e., with substantially no gaps formed between the partial numerical apertures directed from each Fresnel lens segment 70. Particularly, the beam combining design of the disclosed embodiment enables merging the axial part of the full illumination numerical aperture with its surrounding or circumferential parts to achieve uniform and substantially gap-free illumination. In alternative embodiments, lenses other than Fresnel lenses, such as lenses with spherical or aspheric surfaces, or any combination of the above, may be used.

FIG. 6 is a schematic sectional illustration of prism combiner 32 of FIG. 1, together with imaging assembly 76, in accordance with an embodiment of the invention. Prism combiner 32 comprises an upper prism 80 and a lower prism 82, joined by a beamsplitter layer 84. Prism combiner 32 further comprises a first face 90, a second face 94, and a third face 102. Objective optics 77 of imaging assembly 76 image field 34 along a second optical axis 78 onto sensor 79, for example with an optical numerical aperture between, for example, 0.1 and 0.3. First and second optical axes 35 and 78, respectively, overlap in the space between beamsplitter layer 84 and field 34.

Extreme rays 86 and 88 arriving from illumination assembly 20 to first face 90 originate from two outermost cells 50 on opposite sides of extended radiation source 22. Central rays 92 arriving from illumination assembly 20 to first face 90 originate in central cell 52 of extended radiation source 22. All of rays 86, 88, and 92 are partially transmitted and partially reflected by beamsplitter layer 84 inside prism combiner 32, with only the transmitted rays shown. In the disclosed embodiment, rays 86, 88, and 90 exit from prism combiner 32 through second face 94, with rays 86 and 88 incident on field 34 at angles of incidence exceeding ±55 degrees and rays 92 incident on the field at a normal angle (0 degrees).

The illumination is scattered (typically reflected and/or diffracted) from field 34 as rays 96 at a distribution of angles that depends on the features on the field. In the pictured example, only those rays 96 are shown that are within the numerical aperture of the objective optics of imaging assembly 76. Rays 96 enter prism combiner 32 through second face 94, and are partially reflected and partially transmitted by beamsplitter layer 84, with only reflected rays 98 shown. Reflected rays 98 impinge on second face 94, where they are reflected by total internal reflection (TIR) into rays 100. In total, second optical axis 78 reflects twice within prism combiner 32. Rays 100 exit prism combiner 32 through third face 102, and are received by imaging assembly 76, which then images field 34 onto sensor 79.

As rays 86 and 88 impinge on field 34 at a numerical aperture exceeding the numerical aperture of objective optics 77, they create dark field illumination, whereas rays 92 impinging on the field at a smaller angle of incidence create bright field illumination. Radiation source controller 23 can control the numerical aperture of the illumination by energizing different groups 54 of emitters in extended radiation source 22, and can thus select either dark field or bright field illumination, or both. Additionally or alternatively, radiation source controller 23 can select a certain azimuthal angle or range of azimuthal angles to illuminate by energizing only the emitters in the corresponding sector or sectors.

Second Embodiment

Figure 7:
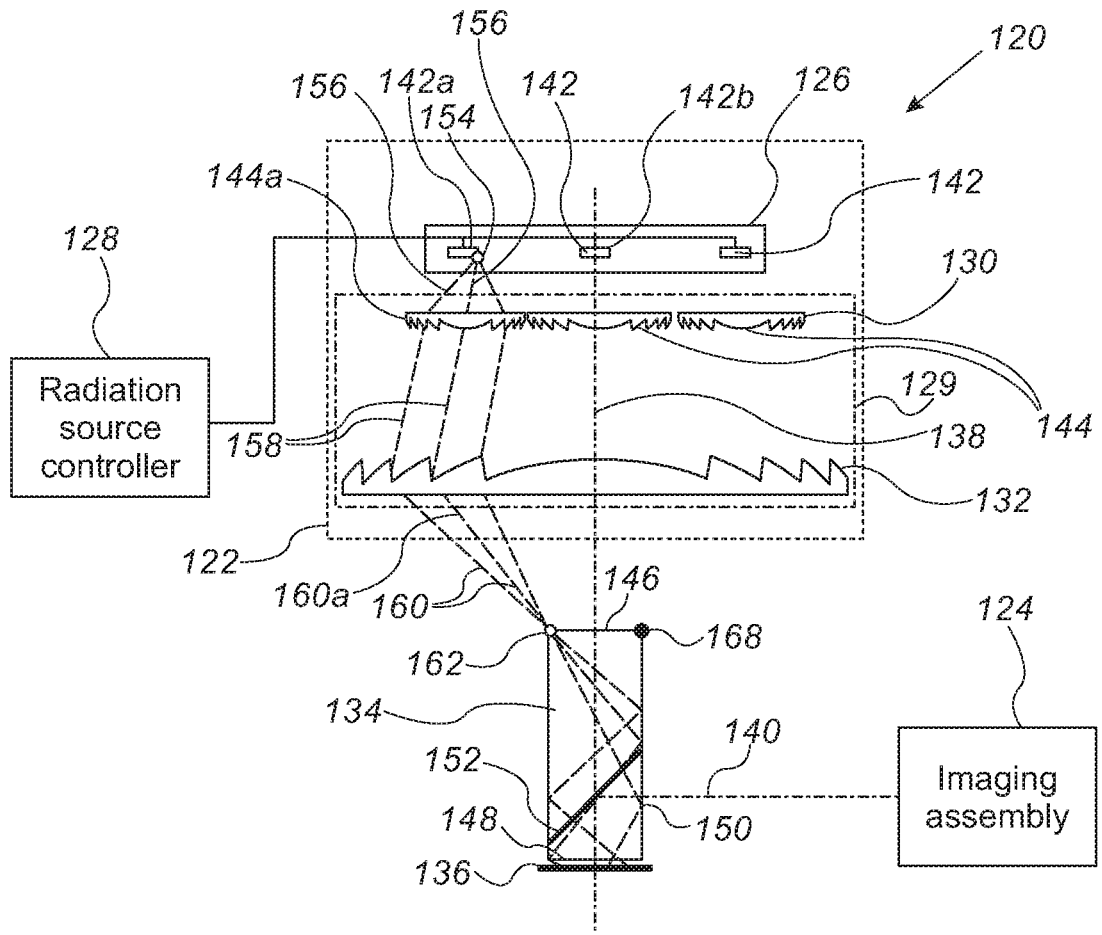
FIG. 7 is a schematic sectional illustration of an optical apparatus, in accordance with another embodiment of the invention.

FIG. 7 is a schematic sectional illustration of an optical apparatus 120, in accordance with another embodiment of the invention.

Optical apparatus 120 comprises an illumination assembly 122, an imaging assembly 124, and a prism combiner 134. Illumination assembly 122 comprises an extended radiation source 126, a radiation source controller 128, and condensing optics 129, which comprise a collimating lens array 130 and a focusing lens 132. Illumination assembly 122 illuminates, through prism combiner 134, a field 136 along a first optical axis 138. Field 136, with a finite separation (typically 1 mm) from prism combiner 134, is imaged along a second optical axis 140 through the prism combiner, (reflected by surface 152) by imaging assembly 124 which is similar in design to imaging assembly 76, as shown above.

Extended radiation source 126 comprises solid-state emitters 142, arranged in an array and coupled to radiation source controller 128, with each solid-state emitter independently energized by the controller. Each emitter 142 radiates at a single wavelength or range of wavelengths, which is typically the same for all the emitters. In an alternative embodiment, multi-wavelength illumination, switchable between wavelengths or combinations thereof, with uniform angular coverage, may be implemented by replacing each solid-state emitter 142 by an emitter assembly, optically combining multiple, independently-energized solid-state emitters, as in the preceding embodiment.

Collimating lens array 130 comprises an array of Fresnel lenses 144, wherein each lens is positioned opposite exactly one solid-state emitter 142, and wherein the lenses are butted together (similarly to the lenses in collimating lens array 27 of FIG. 5). Focusing lens 132 comprises a single Fresnel lens. In alternative embodiments, lenses other than Fresnel lenses, such as lenses with spherical or aspherical surfaces, or any combination of the above, may be used.

Prism combiner 134 comprises a rod with a constant rectangular cross section (wherein the term "rectangular" includes square shapes) along the rod, a first face 146 facing condensing optics 129 and in proximity to it, a second face 148 facing field 136 and in proximity to it, and a third face 150 facing imaging assembly 124. Prism combiner 134 functions as a homogenizing rod for the spatial distribution of radiation received through first face 146, and it comprises a beamsplitter coating 152 at a 45 degree angle with respect to its long axis. Condensing optics 129 focus the radiation emitted by extended radiation source 126 onto first face 146, as will be detailed below. Due to its constant cross section, prism combiner 134 preserves the angular directions of the radiation (with a change of sign at each reflection).

Radiation emitted by each of solid-state emitters 142 is received, transmitted, and collimated by the one Fresnel lens 144 of collimating lens array 130 facing the specific emitter. For example, radiation emitted from a point 154 on a solid-state emitter 142a, as rays 156, is transmitted and collimated by a Fresnel lens 144a to form rays 158. Focusing lens 132 receives these rays and focuses them as rays 160 to a point 162 on first face 146, thus imaging solid-state emitter 142a onto the first face, which is the entrance face for radiation from illumination assembly 122. In the embodiment illustrated in FIG. 7, point 154 is chosen to be located at the edge of solid-state emitter 142a, and the ratios of the focal lengths of Fresnel lenses 144 and focusing lens 132 are chosen so that point 162, which is an image of point 154, is located at the edge of first face 146. The rest of the points on solid-state emitter 142a are also imaged onto first face 146 between point 162 and a point 168 on the opposite edge of the first face (corresponding rays are not shown), so that the image of the solid-state emitter exactly fills the first face. Similarly, the images of all the other solid-state emitters 142 fill first face 146, thus averaging the radiation from all the emitters on the first face. By choosing a different ratio of the focal lengths of Fresnel lenses 144 and focusing lens 132, the image of each solid-state emitter can be caused to overfill first face 146.

The analysis of the angular behavior of the illumination on field 136 may be divided into two parts: first, the angular behavior of the illumination on first face 146 is analyzed, and secondly, the angular behavior is transferred to field 136.

The angular behavior of the illumination on first face 146 may be analyzed utilizing FIG. 2 and an analogy between optical apparatus 120 and optical apparatus 10: Collimator lens array 130 and focusing lens 132 may be compared to collimator lens array 27 and focusing lens 28. Solid-state emitters 142 are analogous to exit faces 26, and first face 146 is analogous to field 34. In addition, similarly to the telecentric arrangement in optical apparatus 10, collimator lens array 130 is located so that solid-state emitters 142 are located at its focal plane, and focusing lens 132 is located so that collimator lens array 130 is located at its focal plane.

Thus, analogously to optical apparatus 10, lenses 144 in collimator lens array 130 define the stop of illumination assembly 122 and determine the numerical aperture of the cone of illumination arriving from each lens 144 onto first face 146. As in apparatus 10, condensing optics 129 are telecentric, and the numerical aperture of the illumination is translation-invariant on first face 146. Specifically in the pictured example, the numerical aperture of the cone of rays 160 on first face 146 is determined by lens 144a.

The transfer of the angular behavior from first face 146 to field 136 may now be analyzed using rays 160 that enter prism combiner 134 through the first face. Although rays 160 experience multiple reflections around first optical axis 138 within prism combiner 134, they preserve their angles with respect to the first optical axis (with a change of sign at each reflection) due to the rectangular cross section of the prism combiner. (For the sake of clarity of the schematic illustration, the refraction of rays 160 upon entering prism combiner 134 is ignored, and the number of reflections is limited to two). Continuing the analogy with FIG. 2, the rays from all points of solid-state emitter 142a fill the same numerical aperture at first face 146. As all these rays are transferred by prism combiner 134 to field 136, wherein the prism combiner homogenizes their spatial distribution but preserves their angular distribution, the field is illuminated across its lateral extent by the same numerical aperture as that of rays 160.

Similarly to optical apparatus 10, by butting Fresnel lenses 144 of collimating lens array 130 together, a seamless fill of the entire numerical aperture of the illumination of field 136 can be achieved when all solid-state emitters 142 are energized.

Conversely, when only some of solid-state emitters 142 are energized, a directional illumination of field 136 is achieved. For example, if solid-state emitter 142a is energized, all radiation impinges on field 136 at a high angle. When this angle is beyond the numerical aperture of imaging assembly 124, the illumination comprises dark field illumination. Similarly, energizing a solid-state emitter 142b, located on first optical axis 138, produces bright field illumination. Energizing a group of solid-state emitters 142 that is asymmetrical with respect to first optical axis 138 produces illumination with a twofold angular symmetry on field 136 due to the back-and-forth reflections within prism combiner 134.

Due to the facts that the radiation transmitted by prism combiner 134 from first face 146 is spatially homogeneous and angularly uniformly distributed when exiting from second face 148, the distance between second face 148 and field 136 may be chosen based on the desired irradiance on field 136 and opto-mechanical considerations. This distance may be, for example, between 0.5 mm and 2 mm.

Based on simulations by the inventors, the present embodiment enables illumination of field 136 with a numerical aperture exceeding 0.3 over a diagonal dimension from 2 mm to 20 mm with an irradiance that varies by no more than 10% across the field and with a radiant intensity that varies across the numerical aperture by no more than 20% at all points in the field.

Radiation reflected and diffracted by field 136 returns into prism combiner 134 through second face 148, propagates to beamsplitter coating 152, and is partially reflected and partially transmitted by the coating. The reflected radiation exits through third face 150 and is received by imaging assembly 124, which then images field 136 onto its sensor. First and second optical axes 138 and 140, respectively, overlap in the space between beamsplitter coating 152 and field 136.

Third Embodiment

Figure 8:
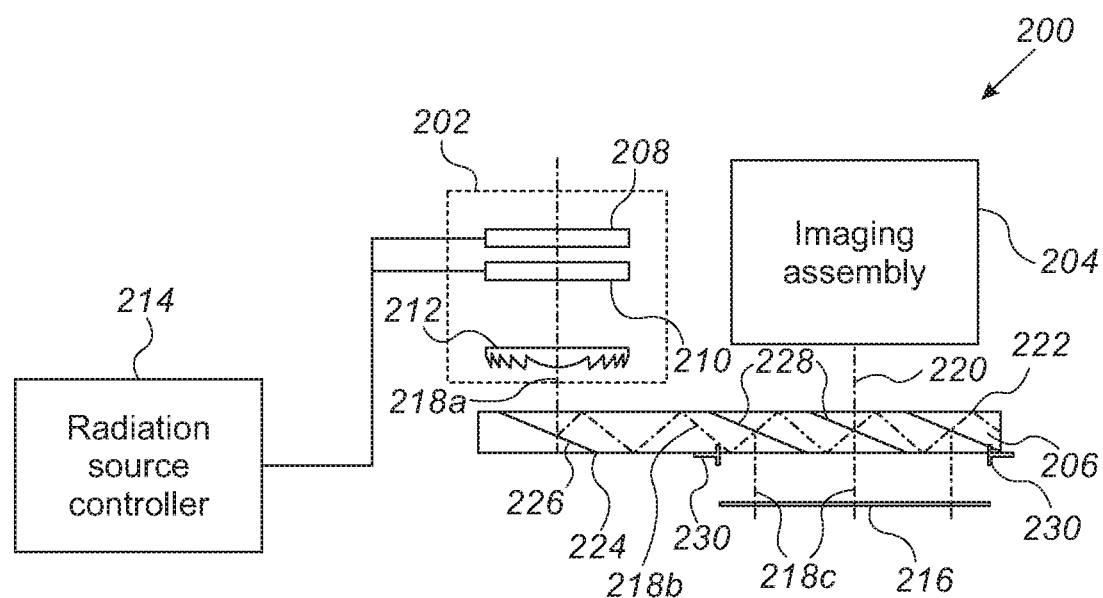
FIG. 8 is a schematic sectional illustration of an optical apparatus, in accordance with yet another embodiment of the invention.

FIG. 8 is a schematic sectional illustration of an optical apparatus 200, in accordance with yet another embodiment of the invention.

Optical apparatus 200 comprises an illumination assembly 202, an imaging assembly 204, and a prism combiner 206. Illumination assembly 202 comprises an extended radiation source 208, a spatial light modulator 210, and a collimator lens 212. Collimator lens 212 serves as the condensing optics of illumination assembly 202, and is in a telecentric position so that spatial light modulator 210, which is the stop of illumination assembly 202, coincides with its focal plane. Collimator lens 212 comprises, in the pictured embodiment, a Fresnel lens. Alternatively, it may comprise a conventional high-NA lens, with either spherical or aspheric surfaces, or a lens with any combination of Fresnel-type, spherical, and aspheric surfaces. The focal length and diameter of lens 212 are chosen in accordance with the required illumination NA and the desired illuminated field size. A radiation source controller 214 is coupled to extended radiation source 208 and to spatial light modulator 210.

Illumination assembly 202 illuminates, through prism combiner 206, a field 216 along multiple first optical axes 218c, as will be detailed below. Imaging assembly 204 comprises a sensor and objective optics (as shown above), which image field 216 along a second optical axis 220 onto the sensor.

Prism combiner 206 comprises a first face 222 and a second face 224, which are parallel with respect to each other. Prism combiner 206 further comprises an internal mirror 226, and multiple internal beamsplitter layers 228, wherein both the mirror and the beamsplitter layers are parallel to each other and tilted with respect to faces 222 and 224.

Figure 9:
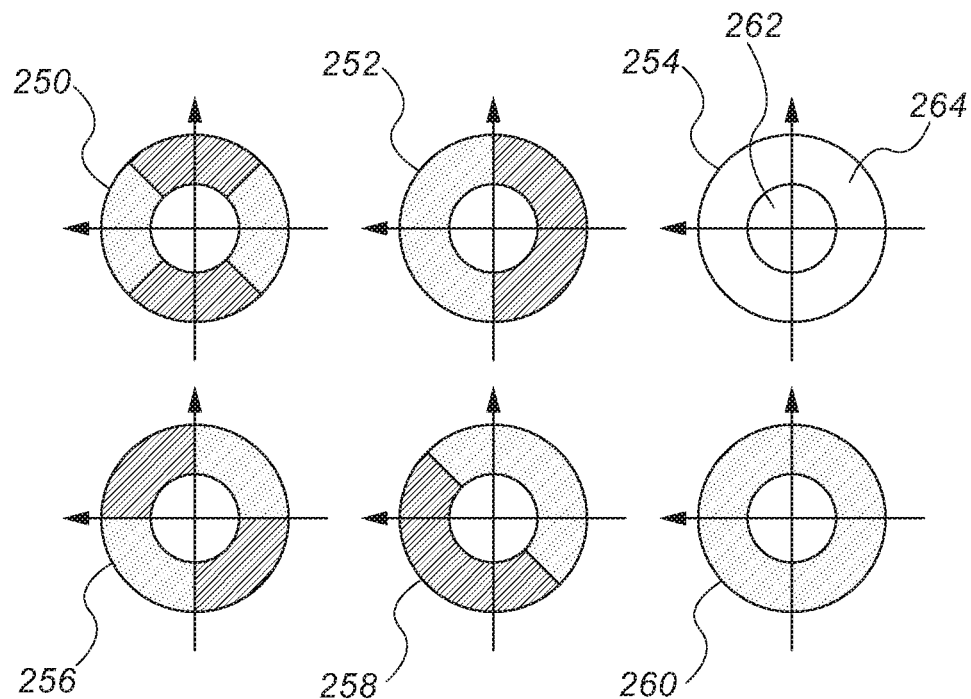
FIG. 9 is a schematic representation of different spatial distributions of the emittance of radiation from a spatial light modulator in the apparatus of FIG. 8, in accordance with an embodiment of the invention.

Extended radiation source 208 emits radiation toward spatial light modulator 210 along a first optical axis 218, which is divided by reflection into segments labelled 218a, 218b, and 218c in different parts of the optical path between extended radiation source 208 and field 216. Radiation source 208 may be configured similarly to a multimedia projector light engine. Its light source may comprise, for example, a single white-light or monochromatic LED, multiple colored LEDs such as red, green, blue, or infrared LEDs, one or several lasers, or a laser-pumped phosphor. Since multiple beamsplitter layers 228 of prism combiner 206 replicate the illuminated field, the étendue of radiation source 208 is only required to be sufficiently high to provide the required uniform illumination NA over the field illuminated by one of the beamsplitter layers 228. The augmentation of étendue by prism combiner 206 is accompanied by a corresponding loss of the radiant intensity of the illumination, as will be explained more fully below. Spatial light modulator 210, based on signals received from controller 214, controls the spatial distribution of the radiation that it transmits and projects toward collimator lens 212 (examples are shown in FIG. 9). Spatial light modulator 210 can be, for example, a digital micromirror device (DMD), a transmissive liquid-crystal (LC) device, or a reflective Liquid Crystal on Silicon (LCOS) device. Alternatively, the SLM may be integrated with extended light source 208 and may comprise a segmented LED source or an Organic Light Emitting Diode (OLED) array.

Due to the telecentric design, collimator lens 212 collimates the radiation that originates from any given point on spatial light modulator 210, thus forming a collimated ray bundle, whose angle with respect to first optical axis 218a is determined by the distance of the given point from the first optical axis and the focal length of collimator lens 212.

First optical axis 218a enters prism combiner 206 through first face 222, impinging on mirror 226. Mirror 226 reflects first optical axis 218a into a reflected first optical axis 218b, which is subsequently reflected multiple times between first and second faces 222 and 224, respectively, before reaching beamsplitter layers 228. The number of reflections between the first and second faces is determined by the thickness of prism combiner 206 and the tilt angle of mirror 226. When the tilt angle of mirror 226 is sufficient so that the radiation reflects subsequently from first and second faces 222 and 224 by total internal reflection, and when prism combiner 206 is sufficiently thin, the beamsplitter behaves as a waveguide. In the disclosed embodiment, prism combiner 206 is typically from 50 mm to 200 mm long, from 20 mm to 50 mm wide and from 2 mm to 10 mm thick. The number of internal reflections is typically less than 10, but may also be higher. Due to the parallelism of faces 222 and 224, the ray angles of the radiation propagating within prism combiner 206 are preserved, and the illumination impinging on field 216 is telecentric. Since the illumination is telecentric, each spatial position on spatial light modulator 210 is translated to an angular direction of the radiation projected onto field 216, and by controlling the spatial light modulator, the angular range of the radiation may be selected.

At each beamsplitter layer 228, first optical axis 218b is partially transmitted and partially reflected into one of reflected optical axes 218c. All of optical axes 218c exit through second face 224 and impinge on field 216, thus illuminating the field. The reflectivity of successive beamsplitter layers 228 is graduated, with reflectivity increasing along the length of beamsplitter 206 so that the reflected flux from each of layers 228 does not vary by more than a predefined limit, for example 10*, relative to the other layers. This graduation may be achieved for discrete wavelengths by, for example, utilizing thin-film interference coatings, wherein each successive beamsplitter coating is designed to have a required ratio between reflectance and transmittance. Suitable thin-film coatings are available from, for example, REO Inc. (5505 Airport Blvd, Boulder CO 8030, USA) and IDEX Corporation (200 Dorado Place SE, Albuquerque NM 87123, USA). Similarly functioning optical coatings, albeit with wider wavelength range and more stringent uniformity requirements than those contemplated for the disclosed embodiments, are implemented in augmented reality optical engines manufactured by Lumus (8 Pinchas Sapir Street, Ness Ziona, ISRAEL 7403631).

Alternatively, the graduation may be achieved by halftone (also termed polka-dot) type coatings, comprising metallic dots of varying diameters. The advantage of a polka-dot coating over a dielectric coating is that it is insensitive to the incident wavelengths and angle of incidence. Its disadvantage is a reduced efficiency due to the multiple transmissions. The ratio between reflectance and transmission may be readily controlled by varying the size of the opaque reflecting dots relative to the transparent parts of the grid. Suitable polka-dot beam splitting coatings are available from, for example, Thorlabs Inc. (56 Sparta Avenue, Newton, New Jersey 07860, USA), Edmund Optics Inc. (101 East Gloucester Pike, Barrington, NJ 08007-1380 USA), Sigma Koki Co. Ltd. (1-19-9, Midori, Sumida-ku, Tokyo, 130-0021, JAPAN) and Shimadzu Corporation (1 Nishinokyo Kuwabara-cho, Nakagyo-ku, Kyoto 604-8511, Japan).

Beamsplitter layers 228 are located at a distance that typically ranges from 2 mm to 20 mm from the plane of field 216. Accordingly, a dot pitch between 0.15 mm and 0.3 mm of beam splitter layers 228 is sufficiently small to average out any potential spatial or angular non-uniformity caused by the discrete nature of the polka-dot coating.

As the illumination on field 216 is afocal and the image of SLM 210 are projected to infinity, a section of prism combiner 206 subtended between the extreme edges of coatings 228 constitutes an additional limiting aperture to the illumination field. This limiting aperture is schematically represented as an effective aperture 230 of second face 224 through which radiation is directed to the field. Illumination light originating in the projected image of SLM 210 is vignetted by effective aperture 230 outside the borders of field 216.

The disclosed embodiment enables illumination of field 216 with a high numerical aperture, limited only by the fact that the propagation of light within prism combiner 206 relies on TIR. For prism combiner 206 constructed of glass having a refractive index n<2, the NA of the illumination impinging on field 216 is limited to 0.35.

The disclosed embodiment further provides, over field 216, an irradiance that varies by no more than 10% across the field and with a radiant intensity that varies across the numerical aperture by no more than 10% at all points in the field.

The radiation illuminating field 216 is scattered (reflected and diffracted) back toward prism combiner 206, and is transmitted by the beamsplitter along second optical axis 220 into imaging assembly 204, which then images field 216 onto its sensor.

The disclosed embodiment, its limited illumination NA notwithstanding, has distinct performance advantages. For example, for a given diagonal dimension of illuminated field 216, it enables a favorable combination of relatively large clear illumination standoff and a short working distance (referring to the distance between prism combiner 206 and field 216). This combination of features is important for example in high speed inspection of fine patterns printed or deposited on uneven or warped electronic substrates.

Additionally, as noted above, replicating the illuminated field reduces the requirements for the étendue of illumination assembly 202. This translates into lower power requirements of illumination assembly 202, as well as into a smaller size and lower cost of the assembly.

FIG. 9 is a schematic representation of different spatial distributions of the emittance of radiation from spatial light modulator 210 of FIG. 8, in accordance with an embodiment of the invention.

Six different spatial distributions 250, 252, 254, 256, 258, and 260 of the radiation exiting from spatial light modulator 210 are shown as an example in FIG. 9. Each distribution comprises a central area, such as a central area 262 in distribution 254, and an annulus around the central area, such as an annulus 264 in distribution 254. A white area indicates a high level of emittance M, for example 90%, wherein 100% refers to highest possible level of emittance and 0% refers to zero emittance. Light hatching indicates an intermediate level of emittance, for example 50%, and dark hatching indicates a low level of emittance, for example 10% or less. By a suitable combination of the lateral dimension of spatial light modulator 210 and the focal length of collimator lens 212, the border between central area 262 and annulus 264 can be chosen to correspond to the numerical aperture of the objective optics of imaging assembly 204. In this embodiment, central area 262 corresponds to bright field illumination, and annulus 264 to dark field illumination. Distributions 250 . . . 260 demonstrate different choices of spatial distributions of emittance from spatial light modulator 210, which at field 216 give full bright field illumination and different angular distributions of dark field illumination.

Although each of the embodiments described above has certain distinct features, other combinations of these features will be apparent to those skilled in the art after reading the present description and are considered to be within the scope of the present invention. As a non-limiting example, the SLM-based radiation source of the third embodiment above may be used with the optics of the first or second embodiment, and the arrays of emitters in the first and second embodiments may be used with the optics of the third embodiment. All such alternative implementations are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical apparatus, comprising:
    an illumination assembly, comprising:
        an extended radiation source emitting radiation with a controllable spatial distribution; and
        telecentric condensing optics, configured to receive and project the emitted radiation with a numerical aperture exceeding 0.3 along a first optical axis onto a field;
    an imaging assembly comprising a sensor and objective optics configured to image the field along a second optical axis onto the sensor; and
    a prism combiner positioned between the field and the telecentric condensing optics and the objective optics and configured to combine the first and second optical axes, while reflecting at least one of the first or second optical axis multiple times within the prism combiner.

2. The optical apparatus of claim 1, wherein the condensing optics are configured to project the radiation uniformly over an area of the field having a diagonal dimension exceeding 2 mm, with an irradiance that varies by no more than 10% across the area and with a radiant intensity that varies across the numerical aperture by no more than 20% at all points in the area.

3. The optical apparatus of claim 2, wherein the diagonal dimension of the area of the field over which the condensing optics project the optical radiation exceeds 15 mm.

4. The optical apparatus of claim 1, wherein the extended radiation source comprises an array of emitters, and the apparatus comprises a radiation source controller, which is coupled to control the spatial distribution by selectively energizing the emitters by the radiation source controller.

5. The optical apparatus of claim 4, wherein the array of emitters is a first array, and wherein the condensing optics comprise a second array of homogenizing rods, each of the homogenizing rods comprising an entrance face positioned to receive the emitted radiation from one or more of the emitters, and an exit face through which the radiation is emitted.

6. The optical apparatus of claim 5, wherein the condensing optics comprise:
    a third array of collimating lenses, wherein each collimating lens is configured to receive and collimate the radiation emitted from a respective one of the homogenizing rods; and
    a focusing lens positioned to receive the collimated radiation from the third array of collimating lenses and to transmit and focus the radiation onto the field.

7. The optical apparatus of claim 6, wherein the collimating lenses comprise Fresnel lenses or the focusing lens comprises a Fresnel lens.

8. The optical apparatus of claim 5, wherein the exit face of each homogenizing rod comprises at least one of a field lens and a diffuser.

9. The optical apparatus of claim 4, wherein the radiation source controller is configured to selectively energize the emitters so as to select an angular range of the radiation projected onto the field, wherein the angular range is selected from a group of angular ranges consisting of a dark field and a bright field illumination range.

10. The optical apparatus of claim 1, wherein the prism combiner is configured to transmit the first optical axis and to reflect the second optical axis twice within the prism combiner.

11. The optical apparatus of claim 10, wherein the second optical axis is reflected by total internal reflection from a surface of the prism combiner that is adjacent to the field.

12. The apparatus according to claim 1, wherein the condensing optics comprise a compensating lens having a meniscus shape in proximity to the prism combiner.

13. The optical apparatus of claim 1, wherein the prism combiner is configured to reflect the first optical axis multiple times within the prism combiner so as to homogenize the radiation projected onto the field.

14. The optical apparatus of claim 13, wherein the first optical axis is reflected by total internal reflection from a surface of the prism combiner that faces the imaging assembly.

15. The optical apparatus of claim 13, wherein the prism combiner has a rectangular cross section and comprises an entrance face in proximity to the condensing optics and an exit face in proximity to the field, and wherein the condensing optics are configured to focus the radiation emitted by the extended radiation source onto the entrance face.

16. The optical apparatus of claim 15, wherein the extended radiation source comprises an array of emitters, and the condensing optics are configured to image each of the emitters onto the entrance face.

17. The optical apparatus of claim 16, wherein the condensing optics comprise a Fresnel focusing lens.

18. The optical apparatus of claim 1, wherein the extended radiation source comprises:
a radiation source; and
a spatial light modulator configured to receive and selectively transmit the radiation emitted by the radiation source, and
wherein the apparatus comprises a radiation source controller, which is coupled to control the spatial distribution by driving the spatial light modulator.

19. The optical apparatus of claim 18, wherein the radiation source controller is configured to selectively control the spatial light modulator so as to select an angular range of the radiation projected onto the field.

20. The optical apparatus of claim 18, wherein the spatial light modulator comprises a digital micromirror device.

21. The optical apparatus of claim 18, wherein the spatial light modulator comprises a liquid crystal device.

22. The apparatus of claim 1, wherein the prism combiner comprises:
an entrance face positioned to receive the radiation projected by the condensing optics along the first optical axis;
an exit face in proximity to the field; and
multiple beamsplitter layers within the prism combiner, wherein each of the multiple beamsplitter layers is configured to reflect a respective portion of the radiation through the exit face onto the field while transmitting the second optical axis.

23. The optical apparatus of claim 22, wherein the prism combiner is configured to serve as a waveguide for the projected radiation.

24. The optical apparatus of claim 22, wherein the prism combiner comprises a mirror that is parallel to the beamsplitter layers and is configured to receive the radiation entering through the entrance face and reflect the received radiation so as to cause the radiation to propagate within the prism combiner.

* * * * *